324-77 SEARCH ROOM

March 7, 1961 C. B. H. FELDMAN 2,974,281

SELECTIVE SIGNAL RECOGNITION SYSTEM

Filed Nov. 1, 1957 3 Sheets-Sheet 1

INVENTOR
C. B. H. FELDMAN
BY Alfred E. Hirsch, Jr.
ATTORNEY

INVENTOR
C. B. H. FELDMAN
BY
Alfred E. Hirsch, Jr.
ATTORNEY

INVENTOR
C. B. H. FELDMAN
BY Alfred E. Hirsch Jr.
ATTORNEY

United States Patent Office 2,974,281 Patented Mar. 7, 1961

2,974,281

SELECTIVE SIGNAL RECOGNITION SYSTEM

Carl B. H. Feldman, Clearwater, Fla., assignor to Bell Telephone Laboratories, Incorporated, New York, N.Y., a corporation of New York Filed Nov. 1, 1957, Ser. No. 693,914

13 Claims. (Cl. 324—77)

This invention relates to wave analyzing systems and particularly to the art of signal recognition and identification.

Whenever a communication channel is used for more than one type of service, the mode or modes of transmission at any instant must be known at each terminal. In those cases in which simultaneous service is required, identity of each may be conveniently preserved by assigning to each a different portion of the frequency spectrum. A wide band channel is, of course, required for this mode of operation and unless each portion of the channel is in constant use, the total channel economy is low. If simultaneous service is not essential, signals representative of the two or more services may be transmitted on a shared time basis. Each service may, therefore, utilize the full bandwidth of the available channel and the over-all system economy is substantially increased. Thus, it has become common practice to transmit various kinds of digital data, facsimile signals, telewriting signals, and electronic dialing and switching signals, each occupying the same wide frequency range, interleaved in time with normal two-way telephone signals over conventional long distance telephone toll lines. By this arrangement there is realized effectively a full time telephone service and a part time data transmission service over the circuit normally employed for the voice service alone.

It becomes essential in programming a circuit for this type of use to disconnect or otherwise inhibit the voice transmitters at each end of the channel during data transmission periods, and to return the transmitters to normal voice service following each such period. Inhibiting of the normal telephone service can, of course, be effected by mutual agreement of both subscribers. Thus, a party desiring to transmit data may advise the called party of this fact by placing a regular telephone call. Each party then disables his own voice generating equipment and switches his auxiliary data equipment into the circuit. Automatic transmission of data over the circuit then continues until all the data has been transmitted or until either party once again needs the channel for other purposes. The problem remains, however, of informing the distant receiving party that the time has come for him to re-enable his telephone transmitter and receiver and disconnect his data generating and transmitting equipment. For convenience, these equipments may be termed respectively, a telephone subset and a data subset. In some cases, a continuous monitoring of the line by each subscriber during the data transmission period may be convenient. In others, continuous monitoring over long periods of time is impossible and an automatic transfer from one service to the other is not only desirable, but essential.

One well-known way of effecting an automatic transfer from one type of service to another is to include in the composite signal some form of supervisory identifying character. Supervisory characters may take any one of a number of forms. They may, for example, comprise digital encoded pulse groups or bursts of alternating current waves modulated in a particular way. Elaborate equipment must be employed, however, to detect these signals. Preferably, a supervisory signal assumes the form of a single-frequency alternating current wave located within the voice frequency band. With this form, there is no increase in the bandwidth requirement of the system and consequently the telephone toll line facilities may be used without alteration. All that is required is that the receiver be responsive to the supervisory waves and not to message waves.

It is known, however, that a complex speech wave may at any instant comprise a single frequency or a small number of nearly sinusoidal waves which, together, are almost indistinguishable from the supervisory tone signal. The receiver must be capable of distinguishing between these speech simulating signals and the supervisory signals in order to prevent unwanted momentary interruptions of the telephone service. One way to insure this is to maintain the supervisory signals at a relatively high amplitude with respect to the amplitude of the voice signals. However, noise signals generated in the transmission system and the attenuation of signals in the transmission apparatus reduce the reliability with which such signals are received. An alternative approach is to employ multiple tone signaling relying on the observation that the occurrence, at any instant, of two nearly pure sinusoidal waves of preassigned frequencies within the speech wave is extremely unlikely. Nevertheless, spurious registrations of supervisory signals are possible even though complex equipment is provided for detecting individually the several supervisory signals. Moreover, in those cases in which a number of separate supervisory signals of different frequencies are employed to permit a plurality of data subsets to be used on the same toll line, the complexity of the detecting equipment is greatly increased.

It is an object of the present invention to effect an automatic transfer from one type of communication service to another in response to an in-band supervisory identifying signal delineating the service.

It is another object of the invention to rapidly and correctly separate sinusoidal supervisory signals from the message signal in which they are interspersed.

The present invention approaches the problem of detecting in-band supervisory signals by means of an entirely different avenue. The determination of the nature of the signal received is advantageously made to be dependent upon a recognition of a distinguishing characteristic associated with each type of signal. In general, single frequency alternating currents, of the type used for supervisory signaling, are periodic with respect to time, and telephony, noise, and data-bearing signals are aperiodic. A wave is defined herein as periodic when its successive zero crossings are evenly spaced apart in time (or occur regularly in time) aside from their particular recurrence rate; i.e., when in a diagrammatic representation of such a wave the successive zeros or axis crossings are uniformly spaced apart, aside from the extent of the spacings. It is aperiodic when its zeros (or axis crossings) vary in an irregular fashion such that the periods between successive zeros or crossings are unequal. Hence, a standard pulse generated at all positive-going axis crossings, for example, will be regularly-spaced for supervisory signals as defined above, and irregularly-spaced for telephony, noise or data-bearing signals.

It is in accordance with the present invention to turn this observation to account by interspersing, in an otherwise ordinary message signal, supervisory signals in the form of periodic waves of any one of a number of different frequencies and alike in their periodic character. The periodic character which they share alike designates them as supervisory signals in contrast to voice waves or data-bearing waves, and their frequencies which are individual to them can further serve to distinguish among them for the purpose of routing each one to its intended destination, for actuating specific frequency responsive apparatus components, for carrying out particular functions, and the like. Detection of the supervisory signals is effected by examining signal zero crossings for regularity, aside from and in contrast to frequency, and interpreting a sequence of axis crossings which remain periodic over a sufficiently long time interval as a supervisory signal. Additionall, the sequence of axis crossings so identified is resolved into a signal sufficient for initiating a desired sequence of automation operations. An important advantage of this system is that the detector is completely insensitive to troublesome variations in amplitude, frequency, or distribution of energy in the two types of signals, or in a combination of these, and is completely independent of the absolute frequency of the periodic portion of the complex wave.

The invention in one of its embodiments includes wave analyzing apparatus which employs a detector for producing separate indications respectively for periodic and aperiodic portions of a wave. Detection is accomplished in this embodiment by limiting the amplitude of the incoming wave to remove any amplitude modulations present and then generating pulses indicative of each cycle of the limited wave, e.g., one pulse for each zero or axis crossover. The density of these pulses is determined by applying them to a low pass filter possessing loss throughout the effective speech range. Hence, higher order harmonics are removed and an auxiliary wave is derived in which aperiodic portions of the wave are characterized by amplitude fluctuations and in which periodic wave portions are characterized by a constant amplitude output signal. By subsequently differentiating the auxiliary wave, the supervisory signal intervals are positively identified.

In another embodiment of the invention, the wave analyzing apparatus employs as a detector a circuit, referred to hereinafter as a width-difference detector, in which regularity or the lack of it is measured by comparing the durations of adjacent positive flat-tops of the limited wave and generating a signal proportional in amplitude to the difference. By making the comparison a subtractive process, regularity is indicated when the signal amplitude is zero.

Aside from greatly simplifying the wave analyzing process and the apparatus with which it is carried out, the present invention permits the detection of supervisory signals of any frequency within the voice band without imposing additional restrictions on the frequency response capabilities of the transmission system.

Since recognition of the supervisory signal is dependent upon the occurrence of constant amplitude or zero signal portions of an auxiliary wave, it is apparent that the absence of any signal could be interpreted as a supervisory signal. Consequently, the amplitude limiter employed is adjusted to limit on noise so that during intervals void of both supervisory signals and voice frequencies, noise signals are passed by the limiter and enter the detector as aperiodic pulses. Consequently, erroneous interpretations are avoided. This noise in the signal may, of course, be reduced to a low unobstrusive level by conventional techniques before it is ultimately utilized. Similarly, spurious line interferences, particularly at power frequencies and their harmonics, could possibly be interpreted by the detector as supervisory signals since they are perodic. This possibility is effectively eliminated by attenuating these signals in simple narrow band filters having high attenuation at troublesome portions of the band. This can be done without seriously distorting either the data or the telephony signals. Additionally, it might be expected that prolonged vowel-type voice sounds are apt to produce false indications. It has been found, however, that the occurrence of such false indications are rare and can, for all practical purposes, be completely eliminated simply by increasing the duration of the examination period of an incoming signal.

The invention will be fully apprehended from the following detailed description of illustrative embodiments thereof taken in connection with the appended drawings in which.

Figure 5:
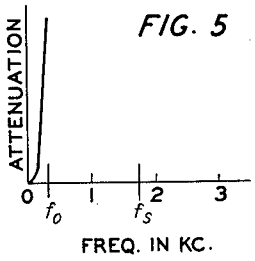
Figure 3:
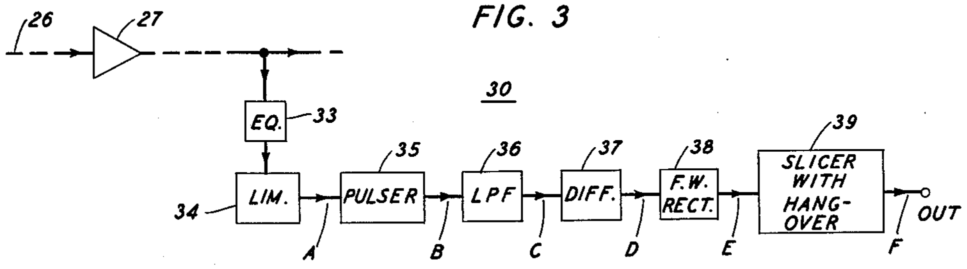
Fig. 3 is a block schematic diagram showing apparatus elements coordinated in accordance with one form of the invention.
Figure 6:
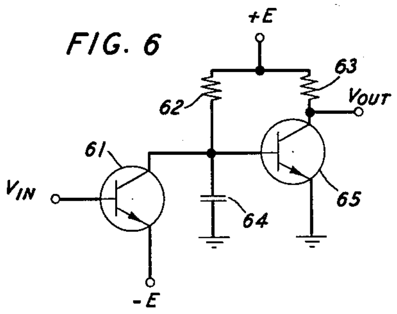
Figure 7:
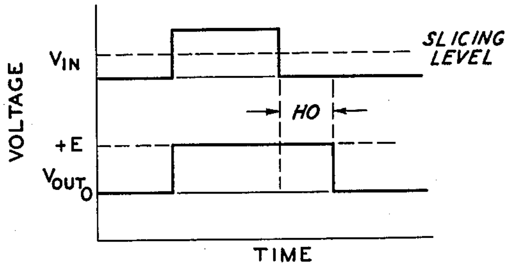
Figure 8:
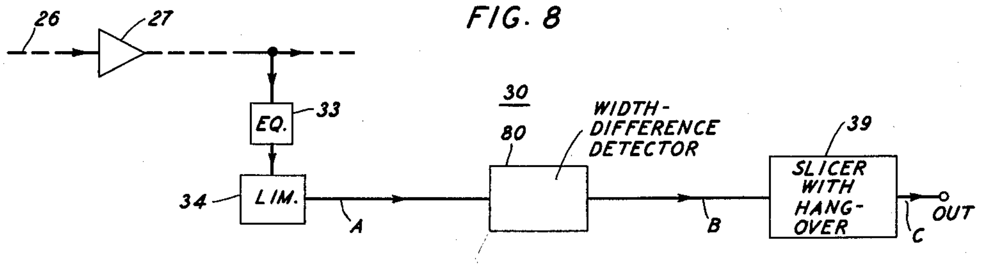
Figure 9:
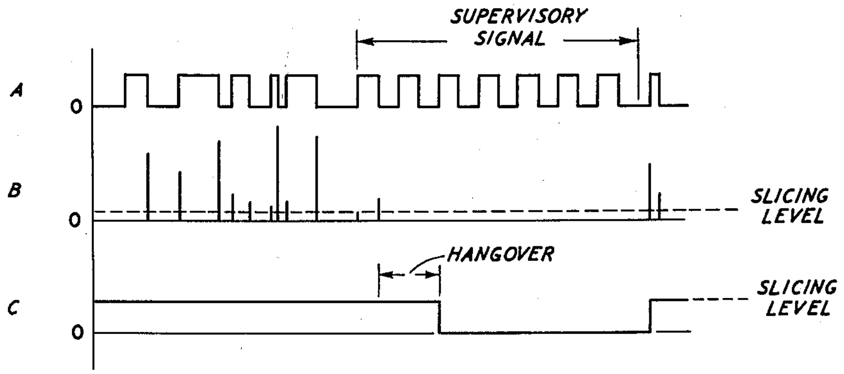
Figure 10:
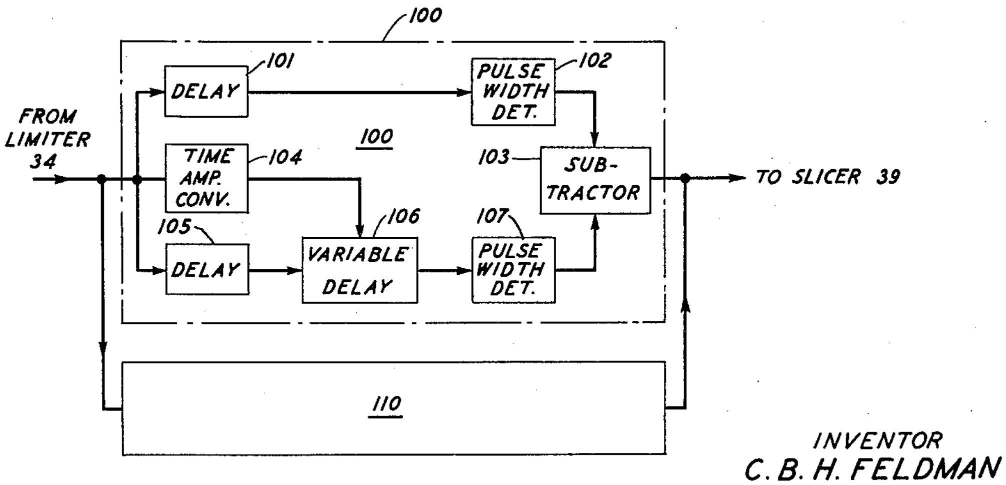

Figs. 4A–F are waveform diagrams of assistance in explaining the operation of the apparatus of Fig. 3;

Fig. 5 is a graph illustrating the attenuation characteristic at cut-off of a low pass filter suitable for use in the practice of the invention;

Fig. 6 is a schematic diagram of a slicer circuit exhibiting delay which may be used in the system of Fig. 3;

Fig. 7 is a set of graphs illustrating the operation of the slicer of Fig. 6;

Fig. 8 is a block schematic diagram showing apparatus coordinated in a manner alternative to that of Fig. 3;

Figs. 9A–C are waveform diagrams of assistance in explaining the operation of the apparatus of Fig. 8; and Fig. 10 is a block schematic diagram of a width difference detector suitable for use in the practice of the invention.

Referring now to the drawings and especially to Fig. 1A, there is illustrated a complex wave comprising several segments representative of waves which may be encountered in shared time transmission of telephony and data signals, together with a sinusoidal supervisory control signal separating them. Ordinarily, the supervisory control signal is inserted at the conclusion of a transmission of one mode of information and employed to perform the changeover of the various subsets at each terminal to another mode of operation. The supervisory signal preferably comprises a sinusoidal wave at any frequency $f_s$ within the speech band. According to the present invention it is recognizable as a supervisory signal regardless of the frequency of the wave by virtue of its periodic nature as contrasted with the aperiodic nature of either the telephony or data-bearing waves.

It will be convenient hereinafter to apply the term "period" to a speech wave in the same manner as the term is applied to a sinusoidal wave; that is, the period of a speech wave is defined as that portion of the wave in time between two positive going axis crossings. For true sinusoidal waves the period defines, of course, one cycle of the wave. Additionally, it will be helpful to catalogue all wave phenomena into one of two general classes, periodic or aperiodic. Thus, speech, data and noise signals may be classed aperiodic and in-band supervisory signals as periodic waves.

Figure 1:
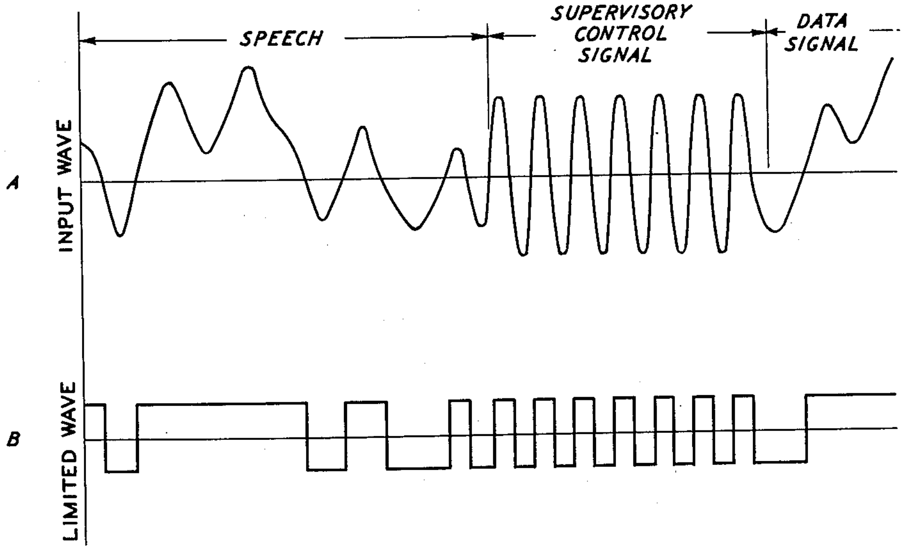
Fig. 1A is a waveform diagram illustrating a typical supervisory signal interposed between a speech signal and a data signal.
Fig. 1B is a waveform diagram illustrating the same sequence of signals after limiting.

In Fig. 1A, the two forms of signals are illustrated for the case in which they occur in time alternation. It is to be noted, however, that the supervisory signal period will generally comprise a considerably greater number of undulations than illustrated in Fig. 1.

Regularity or the lack of it in the composite wave of Fig. 1A can easily be observed after severe limiting of the wave. The wave after limiting is illustrated in Fig. 1B. It becomes immediately apparent in this figure that the segments both of speech and data signals are represented by irregularly-spaced or aperiodic pulses while the supervisory control signal segments are represented by regularly-spaced or periodic pulses.

Figure 2:
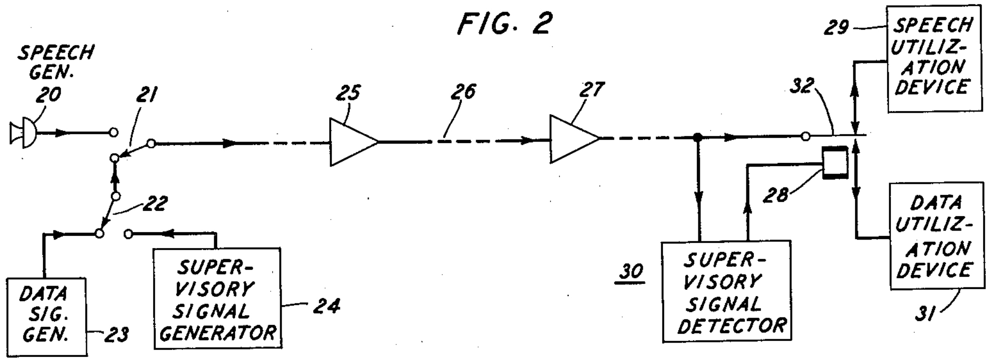
Fig. 2 is a block schematic diagram illustrating the mode of operation of the invention.

Fig. 2 illustrates a system for transmitting both information and supervisory signals over a single transmission medium on a shared time basis. Although a one-way channel is shown, it is to be understood that two-way operation requires only a duplication of the elements shown in Fig. 2 together with conventional means for effecting two-way transmission of message signals over a single line pair. In the figure, speech signals originate, for example, in microphone 20, data signals originate in data generator 23, and sinusoidal signals at a frequency indicative of the particular station and suitable for supervisory functions originate in generator 24. The several signals may be coupled to the line by any well-known means, preferably fully electronic, such that only one is accepted for transmission at any one time. In its simplest form, however, this means may comprise a triple pole switch or, as illustrated, a pair of double pole switches 21 and 22. In this arrangement, switch 21 selects either speech or data signals for transmission and switch 22 selects either data or supervisory signals. The strength of each of the signals is increased in amplifier 25 so that subsequent attenuation and disturbances imparted to the signal during transmission will not seriously impair the characteristics of the wave. It is assumed that amplifier 25 will, in addition, introduce the necessary equalization and in general, transform the signals to ones suitable for transmission.

The selected signal is transmitted over channel 26 to a receiver station which includes an amplifier 27 for reestablishing the received signals to a usable equalized level. The equalized signals are applied to electronic switch 32 and, depending upon the switch position, are supplied to the speech utilization device 29 which may be, for example, a telephone subset or to the data utilization device 31 which may be, for example, a facsimile receiver, a telewriter or other form of data subset. Bridged across the output terminal of amplifier 27 is a supervisory signal detector 30 which continuously examines the incoming signal and for each supervisory signal segment received emits a signal sufficient to activate a relay 28 associated with the electronic switch 32. The emitted signal may, of course, be used to control any form of electronic device capable of routing the incoming signals to the proper utilization device.

Fig. 3 is a block diagram of a supervisory signal detector in accordance with the invention suitable for use in the system illustrated in Fig. 2. Signals derived from amplifier 27 are first passed through equalizer 33 to correct for distortions imparted to the signal by the line or other equipment. It may also include a simple RC differentiator arranged to alter the response of the received signal thereby to prevent the possibility of periodicity at the pitch frequency of the voice wave from being developed. The amplified and equalized signals are next amplitude limited in limiter 34 to convert the continuously varying signals into a sequence of substantially rectangular pulses of constant amplitude. These limited pulses are applied to pulser 35 which generates for each full wave period a single standard pulse of preassigned width and amplitude. One pulse is, for example, positioned at each positive going axis crossing of the wave. These standard pulses are applied to low pass filter 36 which passes only frequencies below half the repetition frequency of the wave to produce a continuous wave which is in some respects indicative of the regularity of occurrence of the pulses in the wave. The filtered signal is then passed through differentiator 37 wherein a voltage is developed proportionate to the rate of change $dE/dt$ of the filtered signal. The differentiated wave is rectified and established at a new reference level in full wave rectifier 38 and shaped in an amplitude sensitive threshold device 39, commonly known as a slicer, to remove any remaining amplitude variations. The slicer produces a sharp step for each departure of the wave from a period of amplitude variation to one void of undulation. This wave is then used to energize the above-described relay arrangement, for example, or to initiate any desired action at the precise time defined by the step.

Figure 4:
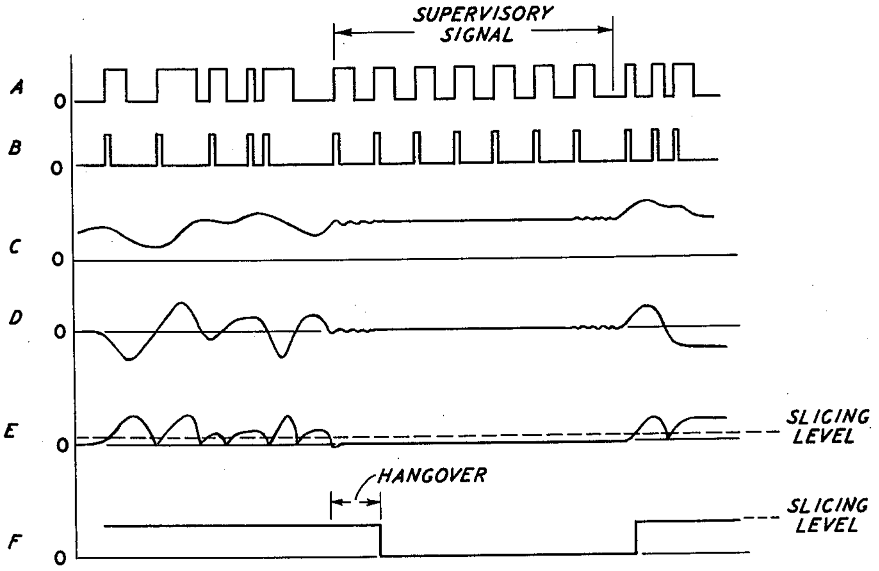

That the foregoing operations result in the generation of a sharp step wave for each periodic wave intercalated in a complex aperiodic wave can readily be seen by referring to the illustrative wave forms shown in Fig. 4.

Fig. 4A illustrates the sequences of limited pulses derived from limiter 34. This figure is substantially a duplicate of Fig. 1B with only the symmetry of the wave altered for the sake of clarity of exposition. The supervisory signal segment is identified in the drawing although it is readily apparent that the pulses representative of this portion of the signal are regularly-spaced in contrast to the irregularity-spaced pulses representative of the information bearing portions of the signal. Limiter 34 holds the channel voltage output below a predetermined maximum value both to insure a sufficient number of flat-topped waves for each segment and to prevent overloading of the following circuits. The limiter circuit is adjusted to limit on noise so that gaps in the information bearing portions of the signal will not be interpreted as a supervisory signal, the result of which would be to disconnect momentarily the telephone microphone and receiver. Pulser 35 which may be any form of device for generating a unit pulse of preassigned height, shape, and duration for each full wave period resolves the rectangular pulses of Fig. 4A into the series of unit pulses illustrated in Fig. 4B. Preferably although not necessarily, a unit pulse is generated at each positive axis crossing.

Fig. 4C shows the signal following its passage through low pass filter 36. Assuming that the cut-off frequency $f_0$ of filter 36 is low with respect to the supervisory signal frequency $f_s$, the response during periods of supervisory signals will be substantially constant at an amplitude level proportional to the frequency of the signal $f_s$. The response when voice, noise or data signals are present is an alternating current superimposed on an average direct current.

Fig. 5 illustrates a typical response curve of frequency versus attenuation for low pass filter 36 in which the relative frequency of the supervisory signal $f_s$ and the cut-off frequency $f_0$ are indicated. Generally speaking, the filter 36 will have a delay in response of substantially $1/f_0$; this being the time required for the response indicated in Fig. 4C to be realized following a change in wave character; i.e., for transient oscillations to die out prior to a period of constant amplitude void of undulation. As the low pass filter cut-off frequency is further reduced, this delay period will necessarily increase. However, a sufficient number of cycles of the signal at frequency $f_s$ may be employed so that this delay is negligible at all frequencies. Since the cut-off frequency $f_0$ necessarily determines the low frequency response both of speech signals and the lowest supervisory signal that can be employed, it is obvious that any frequency above $f_0$ and within the speech frequency band may be employed as a supervisory signal and further that a number of such supervisory signals occurring at different frequencies will be recognized by the detector.

Curve 4D illustrates the wave after differentiation. For both aperiodic and periodic portions, the wave is proportional to the rate of change $dE/dt$ of the applied voltage. Consequently, during aperiodic portions an output signal will be developed since $dE/dt$ has, for each wave element, a finite value. During periodic portions a zero signal output is produced, since $dE/dt$ is zero. That is to say, the derivative of the constant portion of curve 4C is zero. Full wave rectifier 38 then converts the differentiated wave of the form illustrated in curve 4E. While the term rectification is used, it is, of course, possible to achieve the necessary change of wave symmetry by a change only in the direct current level of the wave. Any means for removing the negative-going portions of the wave may, therefore, be considered as a rectifier within the terms of this specification. Advantageously, however, the negativegoing portions of the wave are rectified to produce a unidirectional wave. Furthermore, it is advantageous to re-establish the signal at a low direct current level to prevent small undulations, appearing during the supervisory signal periods as a result of imperfections in the apparatus or variations of pitch, to be misinterpreted as speech.

After rectification, the wave is applied to slicer 39 to remove the remaining undulations and to produce the desired stepped voltage wave at the transition from aperiodic to periodic pulse segments, and from periodic to aperiodic segments. Momentary gaps between pulses in the rectified wave, i.e., short signal intervals in which the signal level is below the slicing level, are bridged over by delaying the response of the slicer by a preassigned interval. A circuit for interposing such a delay is frequently known in short as a hangover. The hangover imparted to the signal insures that the voltage step will occur after the filtered signal has ceased "ringing" and permits positioning of the step after a preassigned time interval following the last undulation of the aperiodic portion of the wave. The output wave containing a sharp step is illustrated in Fig. 4F.

A simple circuit which may be employed conveniently as both the slicer and the hangover circuit is illustrated in Fig. 6. It comprises two transistors 61 and 65 connected as shown. Of these, the transistor 61 is normally biased below cut-off, i.e., Off, by application of a negative voltage $-E$ to its emitter electrode. The emitter of transistor 65 is connected to ground and its base is connected to the collector of transistor 61 and through resistor 62 to a source of positive potential $+E$. Consequently, transistor 65 is biased On and its collector rests at a low reference potential, e.g., zero. Application of a sufficiently positive signal $V_{in}$, from the output of the rectifier 38 to the base electrode of transistor 61 turns transistor 61 On whereupon the storage capacitor 64, connected between ground and the junction of the collector of transistor 61 and the base of transistor 65, quickly charges through the low resistance path from the collector to emitter of transistor 61. Consequently, transistor 65 is quickly turned Off, and the output voltage $V_{out}$ rises to the source voltage $+E$. At the trailing edge of the input signal, i.e., at the instant at which the amplitude of the input wave becomes negative with respect to the slicing level $-E$, transistor 61 is turned off and the charge accumulated on capacitor 64 slowly discharges, allowing the base electrode of transistor 65 to start to return to a more positive potential. After this discharge has progressed for a time, dependent on the time constant of the circuit, transistor 65 again becomes conductive thereby causing the ouput voltage to drop suddenly to zero. The transmission of the trailing edge of the output pulse is consequently delayed with respect to the trailing edge of the input pulse.

Whether the input signal is composed of a series of regularly or irregularly-spaced pulses, the output voltage $V_{out}$ will remain high, bridging the gaps between pulses so long as the amount of hangover is greater than the maximum spacing between two adjacent pulses. This is similar to the smoothing action of a filter.

The input and output waves of the hangover circuit are illustrated in Fig. 7. $V_{out}$ is a signal which is normally maintained at a low potential; which rises quickly coincident with the leading edge of the input pulse $V_{in}$ substantially to the potential of the positive source $+E$, and returns again to the low reference potential at a time somewhat later than the commencement of the trailing edge of the input pulse, as indicated by hangover time HO in Fig. 7.

Fig. 8 illustrates a supervisory signal detector which employs a width-difference detector for transforming the differences in width of adjacent width modulated signals into a series of amplitude-modulated pulses. Equalizer 33, limiter 34 and slicer 39 function in the manner described above. The width-difference detector 80 is a circuit which produces at every negative-going axis crossing in the limiter output wave, a short positive pulse whose amplitude is proportional to the difference in duration of the two preceding positive flat-tops. Similarly, at every positive-going axis crossing a short positive pulse is produced whose amplitude is proportional to the difference in the duration of the two preceding negative flat-tops. Thus, when the axis crossing are spaced unevenly, an irregularly-spaced sequence of pulses of various amplitudes is produced. When the axis crossings are spaced evenly the positive flat-tops are of equal duration and the difference between adjacent flat-tops is zero. In like manner all of the negative flat-tops are of equal duration, and the difference in adjacent flat-tops is zero. Regularity in the input wave is thus indicated at the output of generator 80 by a zero signal. Hence, the slicer with hangover 39 is supplied with a train of wave segments, certain of which contain irregularly-spaced pulses of varying amplitudes and others of which are void of pulses altogether. As before the slicer 39 is an amplitude-sensitive threshold device that bridges the longest gaps between pulses likely to occur in voice, data or noise waves.

The operation of this form of supervisory signal detector is illustrated in the curves of Fig. 9. Fig. 9A depicts a sequence of pulses derived from the limiter 34. Adjacent pulses are compared and, for each difference in duration detected, a pulse is generated whose amplitude is proportional to the difference in duration of the two preceding flat-topped waves. This sequence of pulses, illustrated in Fig. 9B, is one in which irregularly-spaced pulses that are amplitude-modulated are present during voice, data or noise signals and "pulses" of zero amplitude are produced for supervisory signaling periods. This sequence of pulses whose amplitude envelope is a measure of the density of the limited pulses, is applied to the slicer 39 to produce a stepped output wave of the form illustrated in Fig. 9C. This output wave is suitable for operating an electronic switch or another automatic control device.

One convenient form of width-difference detector 80 which may be used in the practice of the invention is illustrated in Fig. 10. It advantageously comprises two structurally identical units 100 and 110 connected in parallel paths between the limiter 34 and the slicer 39. The two units are arranged to effect the comparison operation on alternate pairs of pulses, the net result being that a pulse representative of the difference between each pair is produced. Section 100 of the detector 80 is shown in detail. It comprises two pulse-width detectors 102 and 107 connected in parallel between the converter input and a subtractor circuit 103. Each of these detectors produces for each applied pulse, an auxiliary pulse of unit duration whose amplitude is proportional to the duration of the applied pulse. Any of the circuits well-known in the art for effecting this conversion may be used. Accordingly, the unit pulse output may be arranged to coincide with the leading edge of the applied pulse, the trailing edge or any predetermined point during or after the occurrence of the pulse.

The amplitude difference between two adjacent auxiliary pulses is obtained by subtracting one from the other in subtractor 103. Simple subtraction of the pulses requires, of course, that the two pulses occur at precisely the same time. Hence, one of the pair of auxiliary pulses is delayed for a period equal to the interval between the initiation of each pulse of the pair. Since this interval is not a constant for aperiodic sequences of pulses, the delay time is altered in accordance with the duration of each interval. This is conveniently done by inserting a variable delay circuit 106 in series with one of the detectors, e.g., detector 107. Variable delay devices suitable for this purpose are well-known in the art. One is shown, for example, in U.S. Patent 2,661,163 to A. M. Clogston, granted January 11, 1954.

A control signal suitable for altering the delay characteristic of device 106 may be generated in various ways. It may, for example, be derived by converting the duration of the interval between the pulses into a voltage whose amplitude is proportional to the time of the interval either by charging a capacitor, operating a counter, or the like. In the simple and convenient arrangement illustrated, the control signal is derived from a time-amplitude converter 104 which may be of conventional construction as described, for example, in "Waveforms," volume 19 of the Radiation Laboratory Series published by McGraw-Hill (1949), at page 533. The width-modulated pulses derived from limiter 34 may, accordingly, be connected to the switch tube of a triangular waveform generator. The output of such a generator will be an amplitude-modulated wave train suitable for establishing the delay period of the device 106. Fixed duration delay lines 101 and 105 impart to the signal in each channel a period of delay selected to be greater than the longest interval encountered in the aperiodic portion of the received wave. This enables the control pulse for the variable delay device to be formed and shaped prior to the instant at which the pulse to be delayed reaches device 106.

The output signals produced in subtractor 103 and its counterpart in unit 110 are added together and applied to a slicer with hangover 39 as in the previous embodiments of the invention. In those cases in which the limited pulses occur in a periodic sequence the difference in duration between adjacent pulses is zero and in those cases in which the limited pulses occur in aperiodic sequences, the output is finite. The transition between these two states appears at the output of slicer 39 as a stepped wave suitable for use in the control of automatic changeover equipment.

In each of the embodiments of the invention heretofore described, regularity or the lack of it in an electrical wave is utilized as the sole criterion for characterizing the wave as a supervisory control signal or otherwise. Consequently, a detector embodying this principle is completely independent of the amplitude and frequency of the received wave and is eminently suitable for recognizing in-band supervisory signals.

While the invention has been described in connection with the illustrative embodiments in which a sinusoidal supervisory signal is time interleaved with telephony and data-bearing signals, it is, of course, equally applicable to any other signaling arrangement in which a periodic signal wave is to be separated from aperiodic waves. Moreover, it is obvious that both the leading edge and trailing edge, or both, of the wave produced by the slicer with hangover may be suitably utilized. It is to be understood that the above-described arrangements are only illustrative of the numerous and varied other arrangements which could represent applications of the principles of the invention. Such other arrangements may readily be devised by those skilled in the art without departing from the spirit and scope of the invention.

What is claimed is:

1. In combination, a source of a message wave, means for deriving from said message wave an auxiliary wave whose amplitude at every instant is proportional to the degree of regularity of spacing of axis crossings of said message wave, and means for detecting portions of said auxiliary wave having amplitudes below a preassigned amplitude level.

2. In apparatus for analyzing a wave for its periodic and aperiodic portions, the combination of means for limiting the amplitude of said wave, means for deriving from said limited wave an auxiliary wave whose amplitude at every instant is a measure of the uniformity of spacing of zero crossovers of said limited wave, and means for detecting portions of said auxiliary wave having amplitude below a preassigned amplitude level.

3. In combination, a source of a message wave, means for deriving from said message wave an auxiliary wave whose amplitude at every instant is proportional to the degree of regularity of zero crossings of said message wave, a first utilization device, a second utilization device, means for directing portions of said auxiliary wave whose amplitude is above a preassigned amplitude level to said first utilization device, and means for directing portions of said auxiliary wave whose amplitude is below a preassigned amplitude level to said second utilization device.

4. In apparatus for analyzing a composite wave for its periodic and aperiodic portions and adapted to provide an identifying signal for each portion, means for deriving from said composite wave an auxiliary wave whose amplitude at every instant is proportional to the recurrence rate of zeros of the composite wave, amplitude-sensitive means for distinguishing between undulating portions of said auxiliary wave and portions void of undulation, and means influenced by said distinguishing means for generating, for each undulating portion, a signal of a first preassigned amplitude and, for each portion void of undulation, a signal of a second preassigned amplitude.

5. In combination with apparatus as defined in claim 4, a plurality of utilization circuits supplied with said composite wave, selected ones of said utilization circuits being enabled for operation by signals of said first preassigned amplitude, and others of said utilization circuits being enabled for operation by signals of said second preassigned amplitude, and means for applying the signals developed by said generating means to all of said utilization circuits whereby said utilization circuits become operative in accordance with the amplitude level of said applied signals.

6. In apparatus for obtaining a measure of the degree of regularity of a signal wave, means for limiting the amplitude of said wave, means for generating a pulse having a preselected duration, amplitude, and shape for each cycle of said limited wave, said pulses together forming a pulse train, means for limiting the harmonic content of said pulse train to form an auxiliary wave, means for differentiating said auxiliary wave, and means for selecting portions of said differentiated auxiliary wave in accordance with the magnitude thereof.

7. Apparatus according to claim 6 wherein said selecting means comprises an amplitude-sensitive threshold device.

8. In electric apparatus for providing a first condition of operation in response to an input signal characterized by periodically recurring signal portions and a second condition of operation in response to an input signal characterized by aperiodically recurring signal portions, the combination in the order named of: an amplitude limiter supplied with input signals, a pulse generator, means for limiting the harmonic content of sequences of said pulses, a differentiator, a full wave rectifier, an amplitude-sensitive threshold device, and means for substantially delaying the time of response of said amplitude-sensitive threshold device.

9. In apparatus for separating a message wave into its periodic and aperiodic portions, means for limiting the amplitude of said message wave thereby to produce a wave characterized by successive sequences of flat-topped pulses, means for producing from said limited wave a voltage whose magnitude is a function of the difference in duration of adjacent ones of said flat-topped pulses, and amplitude-sensitive means biased at a preassigned voltage threshold for producing an output signal each time said threshold is exceeded.

10. Electronic apparatus responsive to a train of regularly recurring electrical impulses intercalated with a train of irregularly recurring electrical pulses comprising means for limiting the amplitude of pulses of both of said trains thereby to produce a sequence of flat-topped pulses recurring as in the original trains, means for detecting differences in the widths of adjacent flat-topped pulses in said sequence, and means responsive to said differences occurring below a preassigned value for producing an output signal.

11. Electronic apparatus according to claim 10 wherein said means for detecting differences in the widths of adjacent flat-topped pulses comprises means for converting each pulse in said sequence into a pulse whose amplitude is a function of the width of the pulse, variable delay means for delaying one pulse of each successive pair of adjacent pulses to time coincidence with the other pulse of said pair, comparator means, and means for impressing upon said comparator means both pulses of each successive pair of adjacent pulses, thereby to produce a voltage whose magnitude is a function of the difference in amplitude of said impressed pair.

12. Electronic apparatus according to claim 11 wherein said means for producing an output signal comprises an amplitude-sensitive threshold device supplied with the voltage derived from said comparator means, and means for delaying a preassigned interval of time the response of said amplitude-sensitive device once said threshold has been reached.

13. In apparatus for analyzing a wave for its periodic and aperiodic portions, the combination of means for limiting the amplitude of said wave, means for generating a pulse indicative of the rising portion of each cycle of said limited wave, means for deriving from said pulses an auxiliary wave whose amplitude at every instant is proportional to the repetition rate of said generated pulses, means for differentiating said auxiliary wave, and means for detecting portions of said differentiated auxiliary wave having amplitudes below a preassigned amplitude level.

References Cited in the file of this patent

UNITED STATES PATENTS

| | | |
|---|---|---|
| 2,403,210 | Butement et al. | July 2, 1946 |
| 2,500,200 | O'Brien | Mar. 14, 1950 |
| 2,561,478 | Mitchell | July 24, 1951 |
| 2,562,109 | Mathes | July 24, 1951 |
| 2,584,259 | Crane et al. | Feb. 5, 1952 |
| 2,593,694 | Peterson | Apr. 22, 1952 |
| 2,630,525 | Tamberlin et al. | Mar. 3, 1953 |
| 2,699,464 | Di Toro et al. | Jan. 11, 1955 |
| 2,720,584 | Sloughter | Oct. 11, 1955 |
| 2,724,049 | Ronalt | Nov. 15, 1955 |
| 2,767,582 | Bartelink | Oct. 23, 1956 |
| 2,780,724 | Fichett | Feb. 5, 1957 |
| 2,803,801 | Cunningham | Aug. 20, 1957 |
| 2,823,261 | Zipf | Feb. 11, 1958 |
| 2,878,383 | Yando | Mar. 17, 1959 |